United States Patent [19]

Satzler

[11] Patent Number: 4,560,018

[45] Date of Patent: Dec. 24, 1985

[54] WHEEL TANDEM DRIVE MECHANISM

[75] Inventor: Ronald L. Satzler, Princeville, Ill.

[73] Assignee: Caterpillar Tractor Co., Peoria, Ill.

[21] Appl. No.: 608,757

[22] Filed: May 10, 1984

[51] Int. Cl.$^4$ .................... B62D 55/00; B62D 3/00; F16H 35/00

[52] U.S. Cl. .................... 180/9.1; 74/391; 180/9.26; 180/24.03; 180/241; 180/251

[58] Field of Search .................... 180/9.1, 9.26, 24.03, 180/24.05, 24.11, 241, 251; 74/391

[56] References Cited

U.S. PATENT DOCUMENTS

| | | | |
|---|---|---|---|
| 1,627,225 | 5/1927 | Babel et al. | 180/24.11 |
| 1,648,753 | 11/1927 | Bittner | 180/246 |
| 1,817,028 | 8/1931 | Brockway | 180/24.09 |
| 1,921,660 | 8/1933 | Church | 180/22 |
| 2,216,906 | 10/1940 | Castillo | 74/311 |
| 2,280,741 | 4/1942 | Bolster et al. | 180/22 |
| 2,659,246 | 11/1953 | Norelius | 74/710 |
| 3,727,711 | 4/1973 | Sebern | 180/24.05 |
| 3,883,191 | 5/1975 | Chaumont | 180/9.1 |
| 3,976,154 | 8/1976 | Clark et al. | 180/24.05 |
| 4,359,914 | 11/1982 | Meisel, Jr. | 74/788 |

FOREIGN PATENT DOCUMENTS

| | | |
|---|---|---|
| 7605810 | 11/1977 | Netherlands . |
| 278779 | 10/1927 | United Kingdom . |
| 2048800B | 1/1983 | United Kingdom . |

Primary Examiner—John J. Camby
Attorney, Agent, or Firm—Charles E. Lanchantin, Jr.

[57] ABSTRACT

A drive mechanism is disclosed for rotating a pair of tandem wheel assemblies journalled on a centrally pivoted tandem drive housing. A jointless elastomeric belt extends about the wheel assemblies which are driven by two chains entrained over respective sprockets contained within the tandem drive housing. A planetary gear set is effective to powerably drive both chains with a differential action to minimize the influence of the belt loading upon the chains. The planetary gear set and the sprockets are constructed to deliver a greater torque to the rear wheel assembly than the front wheel assembly through the chains.

33 Claims, 4 Drawing Figures

WHEEL TANDEM DRIVE MECHANISM

DESCRIPTION

1. Technical Field

This invention relates generally to a drive mechanism for powerably rotating a pair of wheels on one side of a vehicle, and more particularly to a drive mechanism for rotating a pair of tandem wheels journalled on a housing and for more effectively transmitting torque between the wheels and a ground engaging belt entrained about the wheels.

2. Background Art

Tandem drive wheels have long been employed to propel vehicles such as motor graders and trucks over the uneven surfaces of the earth. The wheels are commonly driven by endless chains entrained over a plurality of sprockets, and a common axle shaft powerably rotates the juxtaposed drive sprockets on the pivot axis of the tandem drive housing. Such construction is generally shown in the following U.S. patents: U.S. Pat. Nos. 1,627,225 issued May 3, 1927 to E. H. Babel et al; 2,216,906 issued Oct. 8, 1940 to C. C. Castillo; 2,280,741 issued Apr. 21, 1942 to R. H. Bolster et al; 3,727,711 issued Apr. 17, 1973 to J. R. Sebern; and 4,359,914 issued Nov. 23, 1982 to T. C. Meisel, Jr.

In order to improve vehicle traction under adverse footing conditions and to lower ground contact pressures belts have been entrained over the tandem wheel sets on each side of the vehicle. However, putting a relatively strong and substantially inextensible belt or the like around the tandem wheels causes the relatively weaker drive chains to load each other excessively and to break under severe operating conditions. Consequently what is needed is a drive mechanism that can provide a differential action between the chain drive sprockets and thereby prevent locked-in forces.

U.S. Pat. No. 1,817,028 issued Aug. 4, 1931 to M. M. Brockway discloses a wheel tandem drive mechanism having a rear wheel mounted on a dead axle, a front wheel mounted on a floating axle and having a pinion and bevel gear differential undesirably located on the axis thereof, and a chain drive device for connecting one of the bevel gears of the front differential drivingly to the rear wheel. That mechanism does not teach or suggest any belt around the tandem wheels, and the differential is of a construction having a number of disadvantages including torque limitations.

While U.S. Pat. No. 1,921,660 issued Aug. 8, 1933 to H. D. Church does not involve a belt entrained about the wheels or a chain drive system, it is of passing interest because it teaches a wheel tandem drive mechanism using a conventional torque splitting differential located at the outer end of the axle housing immediately below an axle driven worm gear. A pair of longitudinally aligned shafts are driven by the differential and have worm gears thereon that drive gears on the wheel drive shafts. While the torque to the wheels is equalized, that mechanism has space and torque limitations and a relatively undesirable and inefficient worm wheel drive system.

U.S. Pat. No. 2,659,246 issued Nov. 17, 1953 to E. F. Norelius, also does not suggest a belt, but it discloses a rear wheel mounted on a vertically fixed axis, a front wheel mounted on a vertically movable axis, and an undesirable bevel gear train for positively driving the tandem wheels. More particularly, it includes a planetary gear set that differentially apportions equal rim pull and substantially equal rim speed to the wheels, but the location thereof is incompatible with a centrally pivoted tandem wheel housing.

The drive line differential apparatus disclosed in U.S. Pat. No. 3,976,154 issued Aug. 24, 1976 to R. B. Clark, et al, and assigned to the assignee of the present invention, does not involve use of a belt around the tandem wheels, however it recognizes the desirability of providing a pure differential mechanism between the axle and the chain drive sprockets delivering power to the tandem wheels. That interwheel differential mechanism utilizes a driven planet carrier and separate output sun gears driven by two sets of planet pinions and undesirably only apportions equal torque to the drive sprockets.

U.S. Pat. No. 1,648,753 issued Nov. 8, 1927 to C. Bittner, discloses a driving mechanism wherein a conventional axle differential delivers power to a pair of unbalanced differentials which subsequently individually drive one of the front wheels and one of the rear wheels of an automobile. Each unbalanced differential has a driven cage carrying inner and outer pinion gears which drive a pair of bevel face gears. A front wheel chain driving sprocket is connected to one of the face gears and a rear wheel chain driving sprocket is connected to the other. However, such mechanism does not teach or suggest tandem wheels or use of a belt around the tandem wheels for increasing traction and lowering ground pressure.

Heretofore, the attempts to entrain belts about tandem wheels have been primarily limited to the use of track chains having a plurality of interconnected metal links. This is due to the fact that elastomeric belts having the desired load carrying characteristics, minimum elongation rates and long service lives have not been commercially available. Such metallic chains are both noisy and heavy, and usually are positively driven by sprockets that unduly add complexity to the structure. Moreover these chains provide a relatively rough ride and impose speed limitations on the vehicle.

A few attempts have been made to entrain elastomeric belts about two or more wheel assemblies as can be recognized by a review of the following references: British Pat. No. 2,048,800B published Jan. 12, 1983 to R. G. Bell; British Patent Specification No. 278,779 accepted Oct. 20, 1927 to J. D. Siddeley; Netherlands Pat. No. 7,605,810 deposited Nov. 30, 1977 for public inspection to Ir. H Mathol CS; and U.S. Pat. No. 2,898,965 issued Aug. 11, 1959 to G. M. Eddy. These references collectively have various deficiencies such as having a master joint in the belt that is subject to failure in use, or having only one driven wheel assembly so that full drawbar pull cannot be effectively achieved at a reasonable belt tension, and/or having no interwheel differential that can effectively balance torque and allow one wheel assembly to operate at a slightly different rotational rate of speed than the other wheel assembly.

Accordingly, what is needed is a wheel tandem drive mechanism that can powerably rotate a pair of wheel assemblies with a differential action so that the locked-in forces resulting in entraining a belt around the wheel assemblies will be obviated. Preferably the drive mechanism would be so constructed as to drive a relatively lighter and quieter belt solely by frictional contact with the wheel assemblies in order to overcome the problems inherent with positively driven metal chain belts. Since the drawbar pull capability of the wheel tandem drive mechanism can vary with the belt tension, system stiffness, weight per axle and friction coefficient, it is desirable that the mechanism optimize the loading and forces between the tandem wheels and the belt, and the belt and the ground for maximum drawbar pull consistent with a reasonable belt tension that would avoid slip with the wheels under the broad variety of conditions existing in the field. By maintaining a relatively low belt tension the structure required to support the rotating components can be less complex and the belt itself can be of more economical construction. Still further, such a wheel drive mechanism should be simple and reliable in construction, should provide the desired speed ratio reduction, and should be compact and serviceable.

DISCLOSURE OF THE INVENTION

The present invention is directed to overcoming one or more of the above problems.

In one aspect of the invention there is provided a vehicle wheel tandem drive mechanism including a housing, rear and front wheel assemblies individually having a wheel with an elastomeric peripheral surface rotatably connected to the housing, a jointless elastomeric belt entrained about the peripheral surfaces of the wheels and solely frictionally connecting the wheel assemblies, and means for controllably delivering torque to the rear and front wheel assemblies with a differential action and at a preselected torque ratio for driving the belt.

In another aspect of the invention a wheel tandem drive mechanism includes a tandem drive housing oscillatably mounted on the frame of a vehicle on an axis substantially centrally thereof, and rear and front wheel assemblies connected to the tandem drive housing and individually having a pair of juxtaposed wheels. An elastomeric belt is entrained about the wheels in solely frictionally connecting relationship, and drive means is provided for delivering torque to the wheel assemblies with a differential action at a preselected torque ratio effective to deliver a greater torque to the rear wheel assembly than the front wheel assembly when the vehicle travels forwardly.

In a further aspect of the invention a wheel tandem drive mechanism includes a tandem drive housing pivotally connected to the frame on a transverse axis and on which are mounted away from the axis first and second wheel assemblies respectively driven by first and second chain drive means. A planetary gear set is disposed on the axis which includes a sun gear, a ring gear, a planet carrier, and a plurality of planet gears and input means is provided for driving the planet carrier and causing the ring gear to drive the first chain drive means and the sun gear to drive the second chain drive means.

In a still further aspect of the invention a wheel tandem drive mechanism includes a tandem drive housing having a releasable cover member and with the housing being pivotally connected to a vehicle frame on a transverse axis. Advantageously, first bearing means are provided for rotatably supporting an outboard chain drive sprocket on the releasable cover member, and second bearing means are provided for independently rotatably supporting an inboard chain drive sprocket on the outboard chain drive sprocket.

More specifically, the vehicle frame or axle housing is adapted to contain a first planetary gear set serving to provide a differential drive to a pair of juxtaposed drive sprockets located outboard thereof along the central transverse axis of an oscillatable tandem drive housing. In the planetary gear set the ratio of the number of teeth in the ring gear to the number of teeth in the sun gear is preferably greater than two and the drive sprockets are preferably of unequal diameter sufficient to drive the rear chain at a tension greater than the front chain. This causes the rear wheel assembly to be driven with more torque than the front wheel assembly for better matching frictional engagement with the belt entrained about the wheel assemblies. This also provides a net overturning moment upon the tandem drive housing which loads the belt more heavily near the rear wheel when the vehicle is traveling forwardly in the normally preferred working direction. Furthermore, a second planetary gear set is preferably located adjacent to and inboard of the first planetary gear set in order to provide additional speed reduction from the input.

BEST MODE FOR CARRYING OUT THE INVENTION

Figure 1:
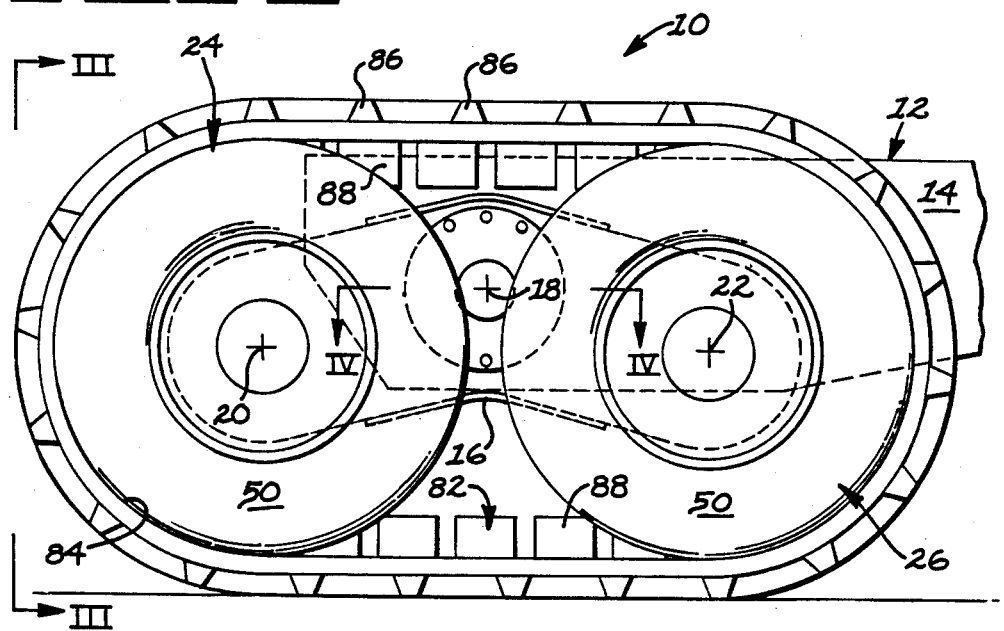
FIG. 1 is a diagrammatic, side elevational view of a wheel tandem drive mechanism constructed in accordance with the present invention and as mounted on a fragmentary portion of a vehicle.
Figure 2:
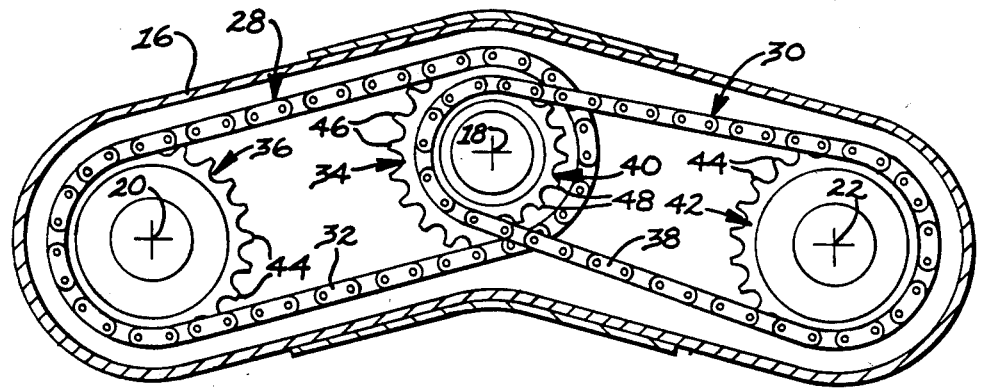
FIG. 2 is a diagrammatic, side elevational view similar to FIG. 1 at a slightly increased scale illustrating only the first and second chain drive means located within the tandem drive housing.

Referring to FIG. 1, there is shown a wheel tandem drive mechanism 10 for a partially illustrated vehicle 12 having a hollow frame or axle housing 14. The wheel tandem drive mechanism includes a tandem drive housing 16 pivotally or limitedly oscillatably connected to the frame on a transverse axis 18 located substantially centrally between, but slightly elevationally above, first and second wheel axes 20 and 22. First and second wheel assemblies 24 and 26 are mounted on the tandem drive housing for rotation about the axes 20 and 22 respectively and are adapted to be driven by first and second chain drive means 28 and 30 respectively as schematically illustrated in FIG. 2.

The first chain drive means 28 includes a first endless chain 32 entrained about a first drive sprocket 34 and a first driven sprocket 36 coaxial with the axes 18 and 20 respectively. In a similar manner the second chain drive means 30 includes a second endless chain 38 entrained about a second drive sprocket 40 and a second driven sprocket 42 coaxial with the axes 18 and 22. In the instant embodiment the driven sprockets 36 and 42 are identical and have twenty teeth 44 each, while the first drive sprocket 34 has twenty teeth 46 and is larger in diameter than the second drive sprocket 40 having sixteen teeth 48 for a purpose that will be subsequently explained.

Figure 3:
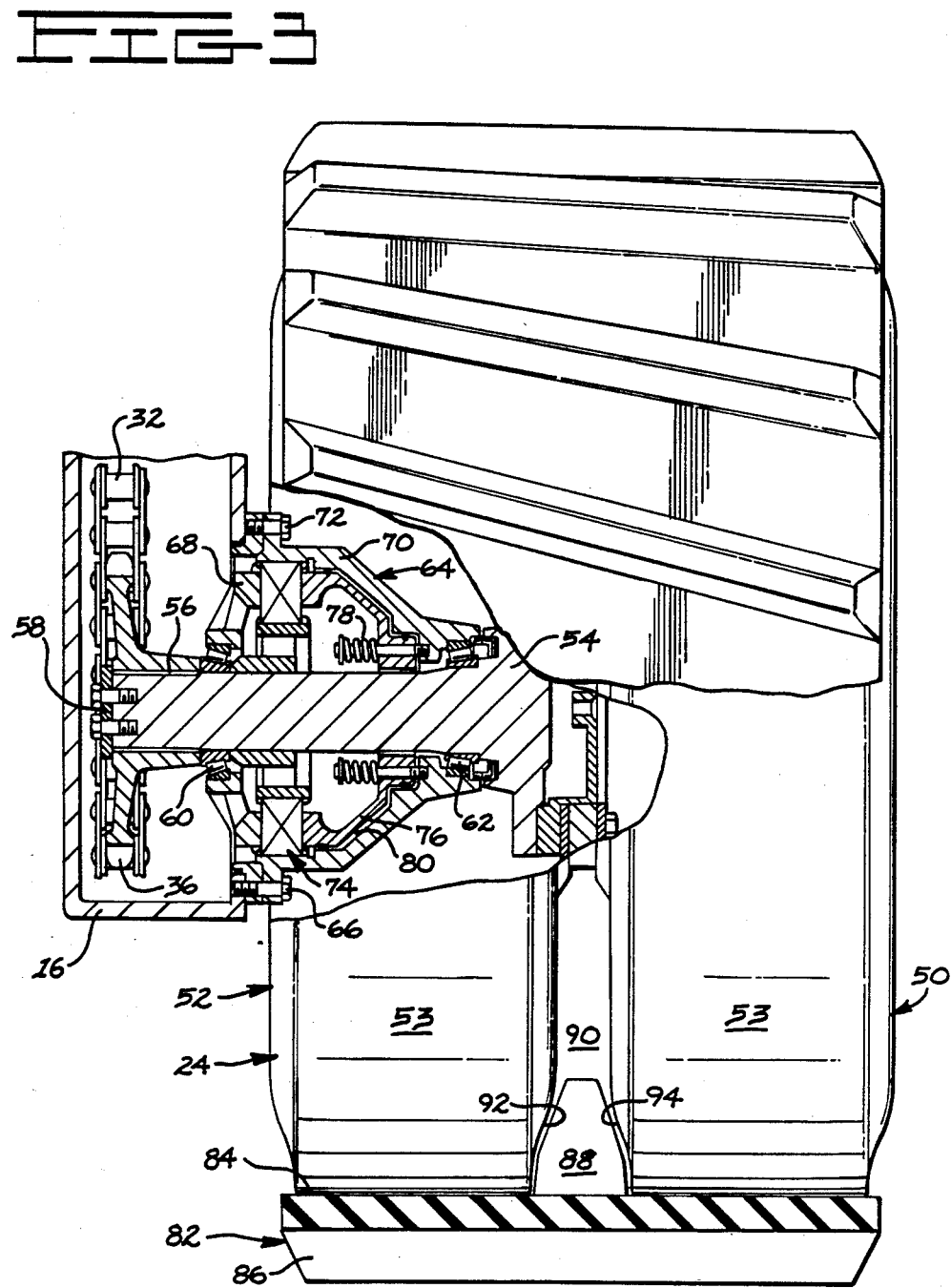
FIG. 3 is a diagrammatic, elevational view taken along line III—III of FIG. 1 illustrating a representative wheel assembly rotatably mounted on the tandem drive housing and a significant portion in broken away cross section to better show details of construction thereof.

Referring to FIG. 3, the representative rear wheel assembly 24 can be noted to include a pair of juxtaposed wheels or relatively laterally rigid inflatable tires 50 and 52 releasably connected to rotate with a wheel spindle or support member 54. Each wheel has a radially outwardly facing elastomeric peripheral surface 53 that is relatively flat, but that can be provided with laterally extending, angularly oriented grooves for releasing material such as mud from an entrapped relationship with the belt, although the grooves are not illustrated. The driven sprocket 36 is releasably connected to the inboard end of the spindle as by a spline 56 and conventional retainer assembly 58, and the spindle is rotatably supported by a pair of bearing assemblies 60 and 62 in a brake and wheel spindle housing 64. In turn, the spindle housing is releasably secured to the outer surface of the tandem drive housing 16 by a first plurality of screwthreaded fasteners 66. The spindle housing has inner and outer members 68 and 70 secured together as a subassembly by a second plurality of screwthreaded fasteners 72. Within these members is a conventional multiple disc brake assembly 74 and associated brake actuating piston 76. The piston is retracted, or moved to the right when viewing FIG. 3, by a plurality of retraction springs 78. In order to engage the disc brake assembly fluid pressure is directed to an actuating chamber 80 moving the piston leftwardly and overcoming the force of the retraction springs as is well known in the art.

Referring to both FIGS. 1 and 3, it can be appreciated that the front wheel assembly 26 of the wheel tandem drive mechanism 10 is similar to the previously described rear wheel assembly 24 with the driven sprocket 42 being necessarily offset. An endless, substantially inextensible elastomeric belt 82 having a smooth or flat interior elastomeric surface 84 is entrained or wrapped partially about the relatively flat elastomeric peripheral surfaces 53 of the inflatable wheels 50 and 52 of both of the wheel assemblies to facilitate solely a frictional engagement therebetween. A plurality of elastomeric cleats 86 extend radially outwardly from the belt for penetrating the ground and enhancing the driving capability thereof, and a plurality of guide structures 88 extend radially inwardly therefrom for maintaining lateral registry between the belt and the two wheel assemblies. The guide structures 88 are received in a circumferential guide channel 90 defined between the facing side surfaces 92 and 94 of wheels 50 and 52 respectively. The belt is preferably endless, that is it does not have a troublesome separating master joint or is jointless, and is suitably internally reinforced longitudinally and laterally so that it has an elongation rate of below 5% under tension. It also should be capable of sustaining tension loads of approximately 17,000 Newtons per lateral centimeter of belt width.

Figure 4:
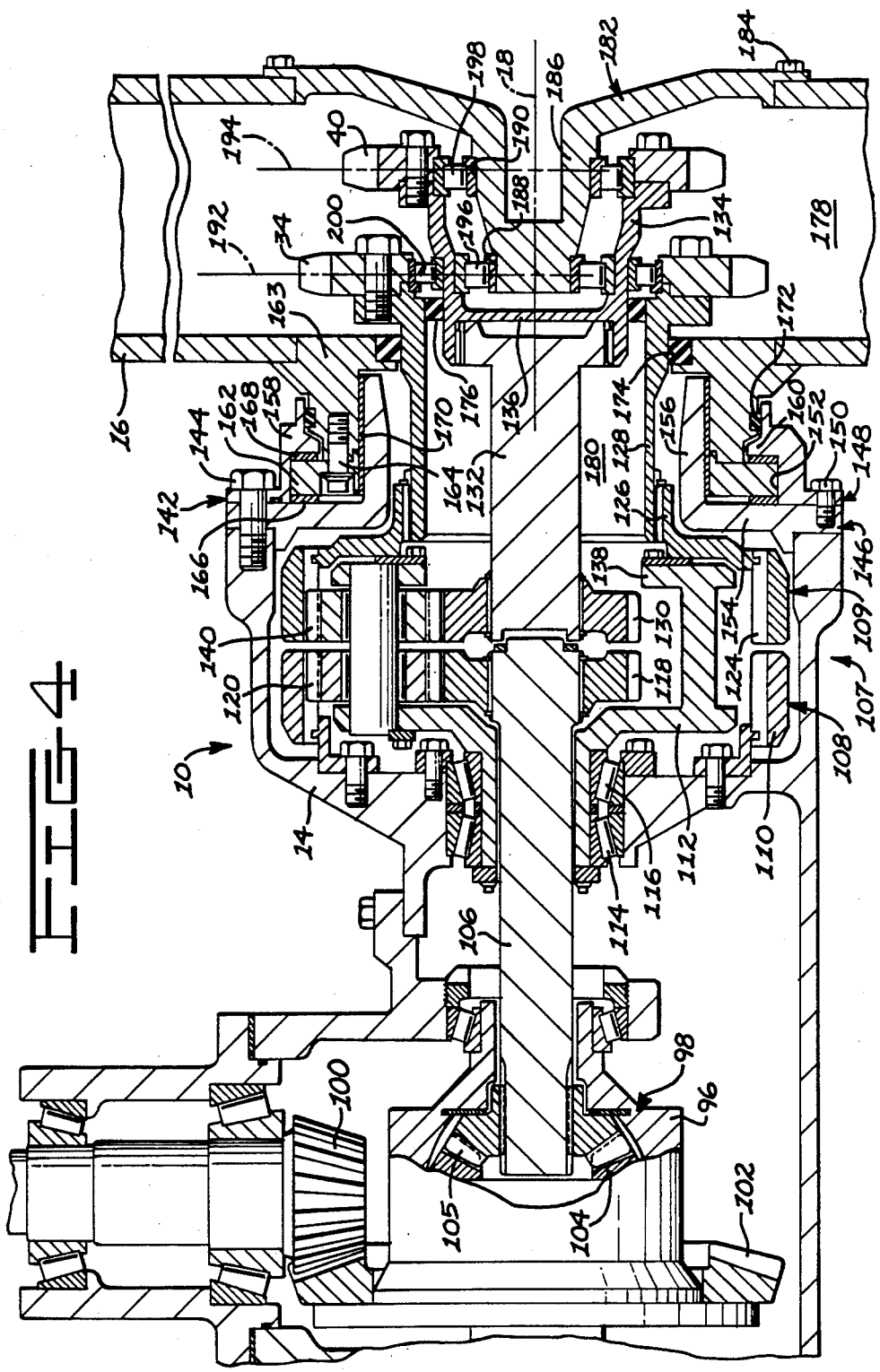
FIG. 4 is a diagrammatic, sectional view taken generally along line IV—IV of FIG. 1 and illustrating the wheel tandem drive mechanism along the transverse axis of the oscillatable tandem drive housing.

Referring now to the sectional view of FIG. 4, it can be seen that the wheel tandem drive mechanism 10 is partially disposed within the axle housing 14 and partially within the tandem drive housing 16. A carrier member 96 of a conventional differential 98 is driven by an input pinion gear 100 intermeshingly engaged with a bevel gear 102 on the carrier member. A plurality of spider gears 104 mounted within the carrier member are adapted to drive a pinion gear 105 on an input axle shaft 106 which is arranged along the transverse axis 18. Although not illustrated, a similar axle shaft extends laterally from the opposite side of the differential to drive the wheel tandem drive mechanism on the other side of the vehicle.

In the instant embodiment the input axle shaft 106 powerably drives planetary gear means 107 including a first planetary gear set 108 for providing a preselected speed ratio reduction and a juxtaposed second planetary gear set 109 for providing a differential driving action with respect to the drive sprockets 34 and 40 and preferably at a speed ratio reduction or minimal speed change. The first planetary gear set 108 has a stationary ring gear 110 releasably secured to the axle housing 14, a planet carrier 112 rotatably mounted within the axle housing by bearing assemblies 114 and 116, a sun gear 118 connected for rotation with the input axle shaft, and a plurality of planet gears 120 mounted on the planet carrier and intermeshing with the sun gear and the ring gear.

Advantageously, the second planetary gear set 109 controllably delivers torque with a differential action to the drive sprockets 34 and 40 and in cooperation with the chain drive means 28 and 30 maintains a preselected torque ratio effective to deliver more torque to the rear wheel assembly 24 than the front wheel assembly 26. Such interwheel differential construction incidently maintains a preselected tension ratio other than unity between the chains 32 and 38. The second planetary gear set includes a second ring gear 124 connected to rotate with the first or inboard drive sprocket 34 through an intermediate flange 126 and a tubular element 128. It also includes a second sun gear 130 connected to rotate with the second or outboard drive sprocket 40 via an intermediate center shaft 132 and another tubular element 134 having a closed inboard end wall 136. A planet carrier 138 of the second planetary gear set is integrally connected to the planet carrier 112 of the first planetary gear set 108 to thereby provide a common planet carrier as may be visualized by reference to FIG. 4, and it rotatably supports a plurality of planet gears 140 which mesh with the ring gear 124 and the sun gear 130. Thus the planetary gear sets 108 and 109 are closely juxtaposed along the transverse axis 18 within the axle housing 14.

A support assembly 142 is releasable secured to the axle housing 14 by a plurality of screwthreaded fasteners 144. The support assembly includes annular inboard and outboard members 146 and 148 secured together as a subassembly by a second plurality of screwthreaded fasteners 150 and defining an annular thrust bearing chamber 152 between them. The inboard member has an annular flange 154 and an axially outwardly extending tubular support hub 156, and the outboard member has a cylindrical casing 158 and a radially inwardly extending annular flange 160. A thrust collar 162 is releasably secured to an axially inwardly extending tubular support portion 163 of the tandem drive housing 16 by a plurality of screwthreaded fasteners 164 and is entrapped in the bearing chamber 152. First and second annular thrust bearings or thrust washers 166 and 168 are located between the collar and the flanges 154 and 160 respectively for limiting the axial movement of the tandem drive housing and for absorbing the thrust forces thereof. Moreover, a phenolic or plastic sleeve bearing 170 is mounted over the tubular support hub 156 and is free to float thereon and free to float within the aligned hollow interior of the thrust collar 162 and the tubular support portion 163 for oscillatably supporting the tandem drive housing 16.

A first annular seal 172 is disposed between the outboard member 148 and the tubular support portion 163, and a second annular seal 174 is disposed between the tubular support portion and the tubular element 128 connected to the first drive sprocket 34. A third annular seal 176 is located between the tubular element 128 and the tubular element 134 connected to second drive sprocket 40. In this way the seals 174 and 176 and the end wall 136 serve to divide the space within the axle housing 14 and the tandem drive housing 16 into an outboard chamber 178 and an inboard chamber 180. This is of benefit in that less oil is required. For example, if the vehicle 12 is on a side slope, oil could otherwise be directed from the differential 98 and planetary gear means 107 axially outwardly into the relatively large chamber 178.

Turning now to the support of the drive sprockets 34 and 40, it may be noted that the tandem drive housing 16 has an access and bearing support cover 182 releasably secured thereto by a plurality of fasteners 184. The cover includes an inwardly extending hub 186 defining first and second bearing seats 188 and 190 substantially centered on first and second vertical and longitudinally oriented planes 192 and 194 respectively. A first roller bearing assembly 196 is mounted on the first bearing seat and a second roller bearing assembly 198 is mounted on the second bearing seat for rotatably supporting the tubular element 134 and the second drive sprocket 40 on the hub 186. In turn, a third roller bearing assembly 200 is mounted on the tubular element 134 immediately radially outwardly of the first roller bearing assembly 196 for rotatably supporting the first drive sprocket 34 thereon. Accordingly, chain loads on the first drive sprocket are directly transmitted along the first plane 192 through the bearing assemblies 200 and 196 to the tandem drive housing 16 so that there is no detrimental loading influence upon the ring gear 124 of the second planetary gear set 109. Chain loads upon the second drive sprocket are likewise primarily transmitted along the second plane 194 through the second roller bearing assembly 198 to the tandem drive housing without any significant affect on the sun gear 130.

INDUSTRIAL APPLICABILITY

In operation, the input axle shaft 106 drives the sun gear 118 and causes the planet gears 120 to rotate about the fixed ring gear 110. This causes the planet carrier 112 to rotate in the same direction as the input shaft but at a preselected speed reduction ratio thereof. Since the planet carriers 112 and 138 of the planetary gear sets 108 and 109 are integrally connected this provides the input to the second planetary gear set. Assuming, for example, that the ratio of the number of gear teeth in the ring gear 124 to the number of gear teeth in the sun gear 130 is 2.2, then the torque delivered to the first drive sprocket 34 is equal to 2.2 times the torque delivered to the second drive sprocket 40, and the speeds of rotation of the respective drive sprockets 34 and 40 are about 93% and 116% of the speed of the input planet carrier 138. In order to substantially maintain a common speed of the two wheel assemblies 24 and 26 for uniformly driving the belt 82, the drive sprockets 34 and 40 are provided with unequal numbers of teeth at the 20/16 tooth ratio previously mentioned. In the instant embodiment the net speed ratio reduction to either wheel assembly is in the order of about 93% of the speed of the planet carrier 138, and the torque delivered to the front wheel assembly 26 is about 57% of the torque delivered to the rear wheel assembly 24. Of course, the tension of the drive chains 32 and 38 is in the same 57% proportion because the driven sprockets 36 and 42 are identical.

In order to appreciate why it is better to deliver a greater torque to the rear wheel assembly 24 it should be recognized that for a preselected belt tension, a preselected axle weight, and a preselected friction coefficient between the smooth interior surface 84 of the belt 82 and the peripheral surfaces 53 of the wheels 50 and 52, that in a forward driving condition the front wheel assembly 26 will slip out at a lower torque level than the rear wheel assembly 24 because of the friction wrap characteristics of the belt. For a preselected and somewhat low friction coefficient at which normal drawbar performance is required, for example about 0.20, it is theorized that the optimum fixed torque ratio between the front and rear wheel assemblies is about 60%. At that point both wheel assemblies would theoretically slip within the belt at the same time when applying maximum torque levels. If a somewhat higher friction coefficient of about 0.55 is assumed, the optimum fixed torque ratio can be lowered to about 25%. But the latter fixed torque ratio would be too low if the vehicle were to be operated in wet mud footing conditions which would lower the friction coefficient substantially. Under such circumstances the rear wheel assembly would slip within the belt and the only way to increase the effective overall drawbar pull of the mechanism would be to increase the tension of the belt 82. In this regard the wheel tandem drive mechanism 10 uses the inflatable or pneumatic tires 50 and 52, at an air pressure of about 350 kPa for example, to apply the desired belt tension. The fixed torque ratio of about 60% is therefore preferred. Such proportion also results in an overturning moment of the tandem drive housing 16 about the transverse axis 18 that achieves a better loading of the rear wheel assembly against the belt and the belt against the ground in the direction of normal forward longitudinal movement of the vehicle 12.

From the foregoing it can be appreciated that the wheel tandem drive mechanism 10 is effective to drive the chain drive sprockets 34 and 40 with a differential action and while maintaining a preselected torque ratio other than unity between the rear and front wheel assemblies 24 and 26. Such interwheel differential construction is particularly adaptable to an oscillating tandem drive housing 16 having the wheel assemblies mounted thereon away from the pivot axis of the housing and to a jointless, substantially inextensible elastomeric belt 82 entrained exteriorly about the elastomeric peripheral surfaces of the wheel assemblies. Moreover, the tandem drive mechanism also includes planetary gear means 107 for providing a speed ratio reduction along the transverse pivot axis of the tandem drive housing, and a plurality of bearings assemblies 196, 198 and 200 which are alignably arranged within the drive sprockets 34 and 40 for minimizing detrimental loading upon the planetary gear means.

In the broader aspects of the invention, it is clear that the wheel tandem drive mechanisms 10 can accommodatingly traverse over uneven terrain at a relatively low ground pressure, for example about 50 kPa or below, and at a fairly significant ground speed without much noise because of the construction of the oscillating housings 16 and the jointless belts 82 and their frictional relationship to the driving wheel assemblies 24 and 26. Moreover, the respective inflatable tires 50 and 52 of the front and rear wheel assemblies are closely juxtaposed or nearly touching in the longitudinal direction and provide the sole means of engagement with the belt. This makes the wheel tandem drive mechanisms relatively compact longitudinally as well as elevationally so that they may be mounted on the first body portion of a conventional articulatably steered vehicle, not shown, without the likelihood of interference with similar mechanisms on the second body portion thereof during a severe turn. Furthermore, the wheel tandem drive mechanism provides superior tractive effort or drawbar pull for a given belt tension and axle weight, and provide improved ride characteristics in comparison with the usual metallic chains having a plurality of joints which are also subject to failure.

It is also to be appreciated that different fixed torque ratios can be obtained between the front and rear wheel assemblies by simply changing the number of teeth and/or the size of the sprockets 34,36,40,42 and the length of the chains 32 and 38 as required, or by changing the ratio of the number of teeth of the ring gear 124 and sun gear 130 without departing from the spirit of the present invention.

Other aspects, objects and advantages of this invention can be obtained from a study of the drawings, the disclosure and the appended claims.

I claim:

1. A wheel tandem drive mechanism for a vehicle having a frame and being capable of traveling in a normal forward longitudinal direction over uneven terrain, comprising:
   a housing;
   means for oscillatably connecting the housing to the vehicle frame on an axis;
   rear and front wheel assemblies individually having a wheel with a radially outwardly facing elastomeric peripheral surface, the wheel assemblies being rotatably connected to the housing away from the axis;
   an elastomeric belt entrained about the peripheral surfaces of the wheels and solely frictionally connecting the wheel assemblies;
   an input drive member; and
   planetary gear set drive means for powerably delivering torque to the rear and front wheel assemblies with a differential action at a preselected torque ratio for driving the belt in response to rotation of the input drive member.

2. The wheel tandem drive mechanism of claim 1 wherein the planetary gear set drive means includes means for delivering a greater torque level to the rear wheel assembly than the front wheel assembly when the vehicle is traveling forwardly.

3. The wheel tandem drive mechanism of claim 1 wherein the planetary gear set drive means includes first and second chain drive means for rotatably driving the rear and front wheel assemblies respectively and a planetary gear set having a sun gear, a ring gear, and a plurality of planet gears, the ring gear adapted to drive the first chain drive means and the sun gear adapted to drive the second chain drive means.

4. The wheel tandem drive mechanism of claim 3 wherein the first chain drive means includes a first drive sprocket, the second chain drive means includes a second drive sprocket, and the first drive sprocket is larger in diameter than the second drive sprocket.

5. The wheel tandem drive mechansim of claim 3 wherein the planetary gear set drive means includes a second planetary gear set for providing a speed reduction input to the first planetary gear set.

6. The wheel tandem drive mechanism of claim 5 wherein the second planetary gear set has an input sun gear, and an output planet carrier connected to drive the first planetary gear set.

7. The wheel tandem drive mechanism of claim 6 wherein the second planetary gear set has a ring gear connected to the frame and providing a stationary reaction thereby.

8. The wheel tandem drive mechanism of claim 1 wherein the planetary gear set drive means includes a rear chain drive means connected to the rear wheel assembly, a front chain drive means connected to the front wheel assembly, and a planetary gear set for differentially driving the rear and front chain drive means and thereby the wheel assemblies at a preselected torque ratio other than unity.

9. The wheel tandem drive mechanism of claim 8 wherein the rear chain drive means includes a first drive sprocket, the front chain drive means includes a second drive sprocket, and the planetary gear set drive means includes means for sealingly separating the region of the drive sprockets from the region of the planetary gear set.

10. The wheel tandem drive mechanism of claim 1 wherein the planetary gear set drive means includes a planetary gear set having a sun gear element, a ring gear element, and a planet carrier element, one of the elements being effective to drive the rear wheel assembly and one of the remaining elements being effective to drive the front wheel assembly.

11. The wheel tandem drive mechanism of claim 10 wherein each of the wheel assemblies includes a pair of inflatable tires defining a circumferential guide channel therebetween, and the belt includes a plurality of guide structures received in the guide channel for maintaining laterally registry therebetween.

12. A wheel tandem drive mechanism for a vehicle having a frame, comprising:
    a tandem drive housing;
    means for oscillatably connecting the tandem drive housing to the frame on an axis substantially centrally of the housing;
    rear and front wheel assemblies rotatably connected to the tandem drive housing away from the axis and individually having a pair of juxtaposed wheels;
    an elastomeric belt entrained about the wheels in solely frictionally connecting relationship;
    an input drive member disposed on the axis; and
    means for delivering torque to the wheel assemblies with a differential action and maintaining a preselected torque ratio effective to deliver a greater torque to the rear wheel assembly than the front wheel assembly in the normal forward travel direction of the vehicle in response to rotation of the input drive member.

13. The wheel tandem drive mechanism of claim 12 wherein the means includes first and second chain drive means for rotating the rear and front wheel assemblies respectively, and planetary gear set means on the axis for controllably delivering torque to the first and second chain drive means.

14. A wheel tandem drive mechanism for a vehicle having a frame, comprising:
    a tandem drive housing;
    means for oscillatably connecting the tandem drive housing to the frame on a transverse axis;
    first and second wheel assemblies rotatably connected to the tandem drive housing away from the transverse axis;
    first and second chain drive means for respectively powerably rotating the wheel assemblies;

a planetary gear set disposed on the transverse axis and including a sun gear, a ring gear, a planet carrier, and a plurality of planet gears mounted on the planet carrier and intermeshing with the sun gear and the ring gear; and means for powerably driving the planet carrier and causing the ring gear to drive the first chain drive means and the sun gear to drive the second chain drive means leading to the first and second wheel assemblies respectively.

15. The wheel tandem drive mechanism of claim 14 wherein each of the first and second wheel assemblies includes a pair of juxtaposed wheels.

16. The wheel tandem drive mechanism of claim 15 including a belt entrained about the first and second wheel assemblies.

17. The wheel tandem drive mechanism of claim 14 wherein the first chain drive means includes a first drive sprocket, the second chain drive means includes a second drive sprocket, and the first drive sprocket is larger in diameter than the second drive sprocket.

18. The wheel tandem drive mechanism of claim 17 including a first tubular element connected to the first drive sprocket and extending inwardly toward the ring gear, a second tubular element connected to the second drive sprocket and extending inwardly toward the sun gear, and means associated with the tubular elements for sealingly separating the region of the drive sprockets from the region of the planetary gear set.

19. The wheel tandem drive mechanism of claim 14 wherein the first chain drive means includes a first drive sprocket, the second chain drive means includes a second drive sprocket and first means for rotatably supporting the second drive sprocket on the tandem drive housing, and the first chain drive means includes second means for rotatably supporting the first drive sprocket on the first means.

20. The wheel tandem drive mechanism of claim 19 wherein the first means includes first and second bearing assemblies substantially centrally aligned radially within the first and second drive sprockets respectively.

21. The wheel tandem drive mechanism of claim 20 wherein the second means includes a third bearing assembly substantially centrally aligned radially exteriorly of the first bearing assembly.

22. The wheel tandem drive mechanism of claim 21 wherein the tandem drive housing includes a releasable support member, the first and second bearing assemblies being mounted on the support member.

23. The wheel tandem drive mechanism of claim 14 wherein the ratio between the number of teeth in the ring gear to the number of teeth in the sun gear is of preselected ratio sufficient to deliver more torque to the first chain drive means than the second chain drive means.

24. The wheel tandem drive mechanism of claim 23 wherein the first wheel assembly is located longitudinally rearwardly of the second wheel assembly.

25. The wheel tandem drive mechanism of claim 24 including a belt having a plurality of outwardly extending cleats and a smooth interior surface entrained about the first and second wheel assemblies.

26. A wheel tandem drive mechanism comprising:
a vehicle having a frame;
a tandem drive housing;
means for pivotally connecting the tandem drive housing to the frame on a transverse axis and having a releasable cover member,
an outboard chain drive sprocket;
first bearing means for rotatably supporting the outboard chain drive sprocket on the releasable cover member;
an inboard chain drive sprocket; and
second bearing means for independently rotatably supporting the inboard chain drive sprocket on the outboard chain drive sprocket.

27. The wheel tandem drive mechanism of claim 26 wherein the first bearing means includes first and second roller bearing assemblies substantially centrally aligned radially with the inboard and outboard chain drive sprockets respectively.

28. The wheel tandem drive mechanism of claim 27 wherein the second bearing means includes a third roller bearing assembly substantially centrally aligned radially with the inboard chain drive sprocket.

29. A wheel tandem drive mechanism comprising:
a frame;
an annular support assembly connected to the frame and including first and second radially inwardly extending annular flanges defining a radially inwardly facing chamber therebetween, and a support hub connected to the first flange;
a tandem drive housing having an axially inwardly extending tubular portion and a thrust collar connected thereto that is entrappingly received in the chamber; and
bearing means for communicating thrust forces from the collar to the flanges and for oscillatably supporting the tubular portion of the tandem drive housing on the support hub.

30. The wheel tandem drive mechanism of claim 29 wherein the bearing means includes a sleeve bearing floatingly mounted between the support hub and the tubular portion of the tandem drive housing.

31. The wheel tandem drive mechanism of claim 29 including a first sprocket, and wherein the tandem drive housing includes support means for rotatably supporting the first sprocket therewithin.

32. The wheel tandem drive mechanism of claim 31 wherein the support means includes a releasable cover having an inwardly extending hub, and first and second bearing means connected to the hub.

33. The wheel tandem drive mechanism of claim 32 including a second sprocket and means for supporting the second sprocket for independent rotation on the first sprocket.

* * * * *